(No Model.)

W. W. SHAILER.
NUT LOCK.

No. 324,174. Patented Aug. 11, 1885.

Witnesses
Wm. W. Shailer
Inventor
By Atty

N. PETERS, Photo-Lithographer, Washington, D. C.

UNITED STATES PATENT OFFICE.

WILLIAM W. SHAILER, OF IVORYTON, CONNECTICUT, ASSIGNOR OF TWO-THIRDS TO SIMON W. SHAILER, OF SAME PLACE.

NUT-LOCK.

SPECIFICATION forming part of Letters Patent No. 324,174, dated August 11, 1885.

Application filed May 18, 1885. (No model.)

*To all whom it may concern:*

Be it known that I, WILLIAM W. SHAILER, of Ivoryton, in the county of Middlesex and State of Connecticut, have invented a new Improvement in Lock-Nuts; and I do hereby declare the following, when taken in connection with accompanying drawings and the letters of reference marked thereon, to be a full, clear, and exact description of the same, and which said drawings constitute part of this specification, and represent, in—

Figure 1:
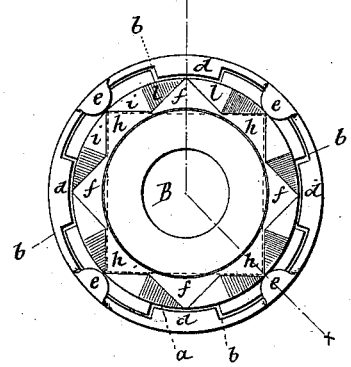
Figure 2:
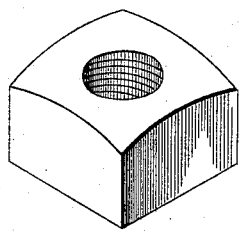
Figure 3:
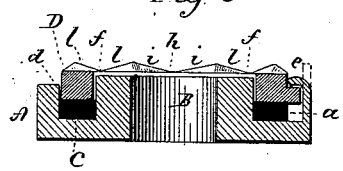

Figure 1, a face view of the washer complete, the position of the nut being shown in broken lines; Fig. 2, a perspective view of the nut; Fig. 3, a vertical section of the washer-cutting on line $x\,x$.

This invention relates to an improvement in the lock-nut for which Letters Patent of the United States No. 292,063 were granted to Nathan E. Shailer, January 15, 1884. In that device the washer is constructed with a central bearing-surface upon which the nut may rest, with a concentric channel around that surface, a spring arranged in the channel, and upon this spring a ring, the upper surface of which is radially serrated, and the under face of the nut correspondingly serrated, so that as the nut is turned the serrations of the nut will pass the serrations on the ring, the spring yielding for such purpose, and until the nut comes to a hard bearing, then the engagment of the serrations of the ring with the corresponding serrations of the nut serve to prevent the accidental turning of the nut. That invention therefore requires a peculiar construction of nut.

The object of my invention is to adapt the locking device to a common nut, so that it may be applied in combination with such a common nut wherever required; and the invention consists in the construction as hereinafter described and more particularly recited in the claim.

A represents the washer, through which is a central opening, B, to surround the bolt, in the usual manner for bolt-washers. In the upper face of the washer is a concentric channel, $a$. Into this channel a spring, C, of elastic material—say, as rubber, cork, or analogous material—is introduced, and upon this spring the ring D is set, and that the ring may be prevented from rotation it is constructed with one or more notches, $b$, in its edge, and the wall of the channel is constructed with a corresponding inward projection, $d$. In the illustration four such notches and projections are shown, and to prevent the escape of the ring the washer is constructed with two or more lugs, $e$, bent down upon the upper surface of the ring after it is introduced, as seen in Figs. 1 and 3. So far the construction is the same as in the patent before referred to.

Instead of making the upper surface of the ring with radial serrations, I construct it with depressions $f\,f\,f\,f$, corresponding to the four angles of the nut to be applied, and also with intermediate like depressions, $h\,h\,h\,h$, also corresponding to the four angles of the nut, so that on the ring there are two positions in which the nut may rest in the recesses of the ring, one as indicated in broken lines, Fig. 1. When resting in such depressions, the spring below the ring forces the ring upward against the under face of the nut, and the salient points between the depressions so engage the nut as to prevent its accidental turning; but that the nut may be forcibly turned to bring it to its extreme bearing, or to unscrew it, as occasion may require, the surface of the ring between the depressions $h\,f$ is inclined upward from such depressions to a central point between the depressions, forming an incline downward toward each depression, $i$ representing the inclines toward the depressions $h$, and $l$ representing the inclines toward the depressions $f$. Because of such inclines, force applied to the nut will cause it to ride over the inclines, compressing the spring until such time as the nut shall be firmly set and rest in either of the positions $h$ or $f$. Then the nut will be firmly held against accidental movement. By this construction of the ring, therefore, I am enabled to employ a common flat-faced washer.

If the nut to be used has more than four sides—say, hexagonal—then the depressions in the ring will be made accordingly, with the inclined surfaces between the depressions; but in fish-joints, to which this invention particularly relates, square nuts are more generally used.

From the foregoing it will be understood that I make no claim to the construction of washer shown in the before-mentioned Patent No. 292,063; but

What I claim as my invention is—

The combination of the washer A, constructed with a concentric channel, $a$, spring C in said channel, the ring D upon the said spring, its upper surface constructed with angular depressions corresponding to the angles of a flat-faced nut, the intermediate surface of the ring between said depressions inclined toward the respective depressions, substantially as described.

WILLIAM W. SHAILER.

Witnesses:
 JAMES PHELPS,
 JAMES L. PHELPS.